(No Model.)　　　　　　　　R. HUGHES.　　　　　2 Sheets—Sheet 1.
HYDRANT VALVE.
No. 590,988.　　　　　　　　　　　　Patented Oct. 5, 1897.
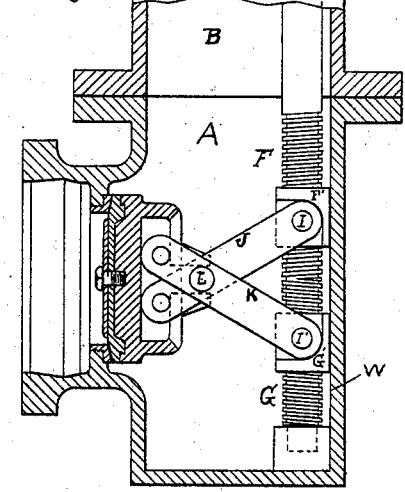
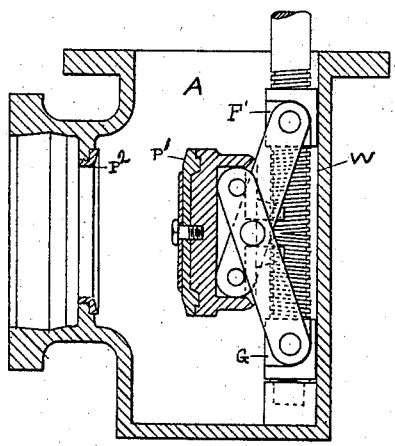
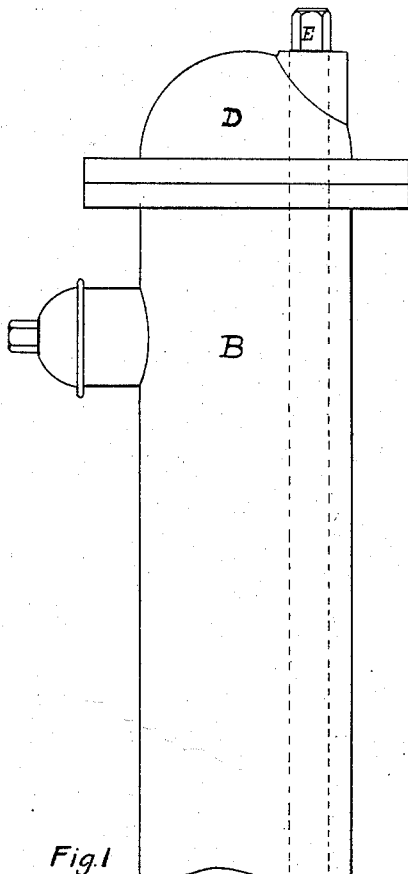
WITNESSES　　　　　　　　　　　　　　　　INVENTOR
Harry A. Holmes　　　　　　　　　　　　Robert Hughes
S. N. Douglas.

(No Model.)  R. HUGHES.  2 Sheets—Sheet 2.
HYDRANT VALVE.

No. 590,988. Patented Oct. 5, 1897.

WITNESSES:
Harry A. Holmes
S. W. Douglas

INVENTOR
Robert Hughes

UNITED STATES PATENT OFFICE.

ROBERT HUGHES, OF WATERFORD, NEW YORK, ASSIGNOR TO JOHN KNICKERBACKER, OF TROY, NEW YORK.

HYDRANT-VALVE.

SPECIFICATION forming part of Letters Patent No. 590,988, dated October 5, 1897.

Application filed January 6, 1896. Serial No. 574,460. (No model.)

*To all whom it may concern:*

Be it known that I, ROBERT HUGHES, a citizen of the United States, residing at Waterford, in the county of Saratoga and State of New York, have invented a new and useful Improvement in Hydrant-Valves, of which the following is a specification.

My invention relates to improvements in a valve for fire-hydrants; and the object of my invention is to construct a lever-operated valve which will at all times work parallel to a desired plane; to provide for constructing the lever mechanism of any desired power by having the lever-pins connected together between the operating-nuts on the stem and the valve, by which construction I am enabled to vary the point of connection to increase or decrease the force exerted on the gate by the levers to any degree I may desire in any design I may require of the hydrant, and also to provide the ends of the levers with round surfaces, so that the ends of the levers will exert the pushing force upon the gate and sustain the reaction of this force upon the operating-nuts instead of these forces being sustained by pins or bolts. I attain these objects by the mechanism illustrated in the accompanying drawings, in which—

Figure 7:
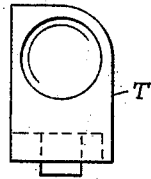
Figure 4:
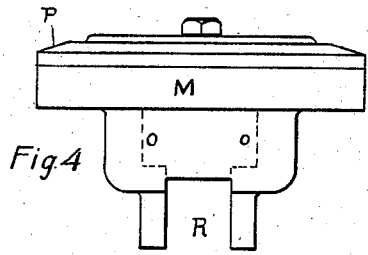
Figure 8:
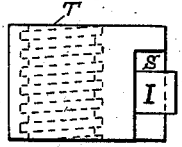
Figure 9:
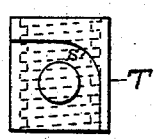
Figure 6:
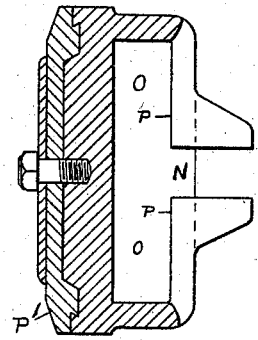
Figure 5:
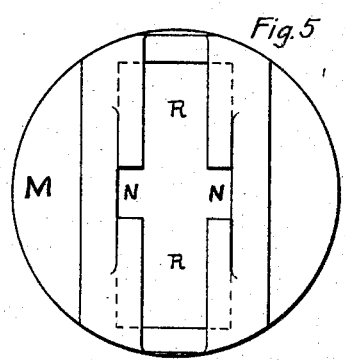
Figure 10:
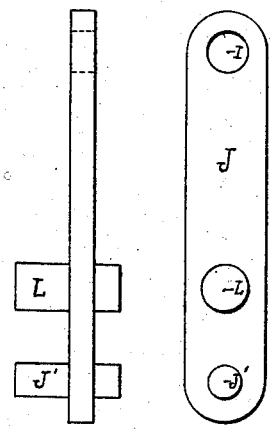
Figure 12:
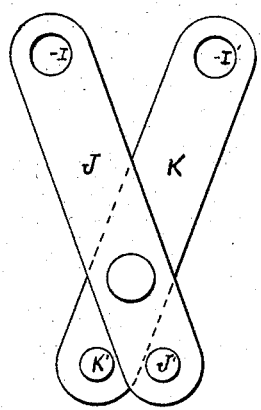
Figure 11:
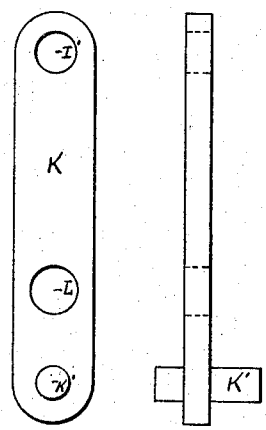

Figure 1 is a vertical section of the hydrant-bottom, showing the valve closed and the stand-pipe bolted to the hydrant-bottom. Fig. 2 is a section of the hydrant-bottom, showing the valve open. Fig. 3 is a plan of the hydrant-bottom, showing the valve open. Fig. 4 is a top view of the gate. Fig. 5 is a view of the back of the gate. Fig. 6 is a vertical section of the gate. Fig. 7 is a top view of one of the nuts. Fig. 8 is a front view of one of the nuts. Fig. 9 is a side view of one of the nuts. Fig. 10 is a top and side view of one of the levers. Fig. 11 is a top and side view of the other lever. Fig. 12 shows the levers connected together.

Similar letters refer to similar parts throughout the several views.

The casing or bottom A of the valve is of suitable form to receive the operating mechanism of the valve and the valve. It is of sufficient size to permit of the valve being removed through the top of it and out of the stand-pipe B. The stand-pipe B is bolted to the bottom. On the operating-stem C, which projects outside of the cover D, is placed the operating-nut E, which can be readily turned by means of a suitable wrench. The lower end of the stem is screw-threaded with right and left hand screws F and G, and on them are attached the right and left hand nuts F and G. These nuts move up and down on the guide H on the inside of the bottom. To these nuts are attached the arms J and K by means of round pins I and I' on the nuts F' and G'. The nuts F' and G' are provided with flanges which are filleted concentrically with the ends of the arms J and K and with the pins I and I'. The levers J and K are fastened together at L by the pin or through-bolt L, which pin may be cast on one of the levers to project through a hole in the other, or each of the levers may be provided with a suitable hole to receive this pin. The valve M is provided with a slot N, which is at right angles to the seating-plane of the valve. The valve is also provided with the grooves O and O, which are at right angles to the slots N and N. The face of the valve P' is made of such a shape as to conform with the face of the seat $P^2$.

The ends of the arms which come in contact with the back of the valve are rounded, so as to always bear against the back of the gate, no matter in what position they may be between the opening and the closing of it. On the ends of the levers J and K are the pins J' and K', which fit into the grooves O O and O O. The pin or bolt L projects through the levers J and K, so as to engage the slots N N. In the slots R R the operating-levers move. It will be readily seen that when the stem-nuts are drawn together, as shown in Fig. 1, the arms J and K force the valve to its seat, and when the nuts are drawn apart, as shown in Fig. 2, the valve is carried away from the seat. When the valve is moved away from its seat, the pins J' and K' travel in the grooves O O and O O, going apart, and the pin L travels toward the back of the valve. As the distances L I and L I' are the same and the distances L J' and L K' are the same, the slots N N at right angles to the face of the valve and perpendicular to the stem, and the grooves O O parallel to the stem and at right angles to the slot N, it follows that on account of the pins J' K' moving on the surfaces P P and the faces of the levers moving on the back of the gate and the pin L moving in the slots N N the plane of travel of the face of the valve is parallel at all times to the stem and to the valve-seat, which is made parallel to the valve-stem.

By making the distances J' L and K' L longer and the distances L I and L I' shorter on each of the levers by altering the position of the pin L or pin-holes it is possible to make the force exerted by the levers on the valve less powerful and to make the valve operate more quickly. In some instances this may be desirable.

The back T of the filleted portion of the nut travels on the back W of the casing. Consequently in operating the valve the ends of the levers simply turn in the fillets of the nuts and do not travel up or down on the guide. By having the levers fixed in the nuts, as herein described and shown, when the nuts are made of brass and the levers of iron and the back of the casing of iron no similar metals come in contact. If the iron levers came against the back of the casing, it would be necessary to face the casing with brass, besides having the disadvantage of a rotary and sliding motion of the levers on the back of the casing. By the construction, hereinbefore described of the ends of the levers working on the filleted portions of the nuts not only the above described features are secured, but the straining of the pins which hold the levers on the nuts is avoided, the strain being sustained by the back of the casing.

I find that it is not necessary to have the pins J' and K' on the ends of the levers project on both sides of the levers, as the device will operate satisfactorily where each only projects on one side of its lever.

I do not wish to limit myself to the drawing together of the two lever end supports or nuts F' and G' by the right and left hand screws F G, as they may be actuated in any other way. The lower part of the stem may be used as only a support for these lever end supports and they may be moved on it in any desired manner.

What I desire to claim as new and of my own invention is—

1. In a hydrant-valve, the combination with the casing, of a right and left hand threaded stem having on it right and left hand threaded nuts, levers attached to said nuts, a valve to close the opening in the valve-casing, said levers engaging with said valve, and being pivoted together between their ends to operate the valve, substantially as described.

2. In a hydrant-valve the combination with the casing, support and actuator for the lever end supports, lever end supports, levers attached to said lever end supports, a valve to close the opening in the valve-casing, the valve provided on its back with grooves, pins on the ends of said levers to engage said grooves in the valve, levers pinned intermediately of their ends, of a slot or guide on the gate to receive the intermediate pin of the levers, substantially as described.

3. In a hydrant-valve the combination of the casing, support and actuator for the lever end supports, lever end supports, a valve to close the opening in the casing, levers crossing each other and having mechanism for keeping the valve parallel to the desired plane, substantially as described.

ROBERT HUGHES.

Witnesses:
HARRY A. HOLMES,
S. N. DOUGLAS.